Patented Sept. 2, 1924.

1,507,509

UNITED STATES PATENT OFFICE.

KIKEI NISHIKAWA, OF TOKYO, JAPAN.

PROCESS FOR MANUFACTURING CARBON FILAMENT FOR INCANDESCENT LAMP.

No Drawing. Application filed July 21, 1921. Serial No. 486,549.

*To all whom it may concern:*

Be it known that I, KIKEI NISHIKAWA, residing at 8th. Sanchome, Nishikicho, Kanda-Ku, Tokyo, Japan, have invented certain new and useful Improvements in the Process of Manufacturing Carbon Filaments for Incandescent Electric Lamps, of which the following is a specification.

This invention relates to a process of manufacturing carbon filaments for incandescent lamps, and is directed particularly to a substantial elimination of the defects in resistance to temperature incident to carbon filaments as now manufactured.

It has been discovered as a result of experiment that magnesium, which is present as one of the ash residues in carbon filaments causes a reaction at a temperature substantially 1800° C. with the result that the carbon is disintegrated and therefore the life and temperature resistance of the present carbon filament is materially reduced.

Having determined that the presence of magnesium is at least the primal cause of this carbon disintegration, it is the object of this present invention to eliminate this magnesium in so far as such may be possible and therefore overcome the defects incident to its presence in the completed filament.

In carrying out the process and particularly in the elimination of the magnesium, it is designed to first eliminate a considerable proportion of this magnesium ash in the initial treatment of the material making up the filament, and then to further refine any residue of magnesium remaining in the filament to thereby reduce such magnesium to a substantially immaterial factor and thus permit the production of a practically pure carbon filament having an extreme temperature resistance and long life.

In carrying out the process, the raw material, as cotton, is pulverized and treated with acid to reduce it to a substantial pulp. If, for example, the raw material is treated with a 50% solution of chloric acid at a temperature of 60° C. for about two hours and the powdered cellulose thus obtained is boiled for a considerable time, say a week, the soluble salts are substantially eliminated. The usual process of making the filament is then proceeded with, and then refined for the further elimination of magnesium in the following manner. Magnesium chloride when heated in crystal or hydrated mass is decomposed before vaporization of the water, and there is then produced chloric acid and magnesium. But, if the production of chloric acid is prevented, then decomposition can also be prevented. For instance, if magnesium chloride is heated in the presence of chloric acid gas, decomposition does not take place. Therefore, magnesium chloride which is thus heated in the carrying out of the present invention, has a less volatizing temperature than that of magnesium, and will be eliminated at a temperature less than 1800° C.

Therefore, the carbon filament is, by the present invention, refined by chemical process to thereby eliminate a considerable proportion of the magnesium ash and then further refined for the elimination of magnesium by heating the filament in the presence of carbon chloride or other halogen carbon gas.

The treatment of the filament in the presence of carbon chloride may be, if desired, had within the glass bulb forming lamps, the heating taking place through the usual electric current. The final product obtained as a result of the above process has been found to resist 2000° C. for thousands of hours, while emitting a white light of great brilliancy.

Claims:

1. A process of treating carbon filament, consisting in eliminating the magnesium ash from the raw material by chemical process and refining the formed filament for further elimination of magnesium.

2. The process of manufacturing carbon filament for incandescent electric lamps, consisting in first refining the raw material by chemical procedure for the elimination of the magnesium ash and then further refining the filament made of such raw material by treating it in the atmosphere of a halogen carbon gas at high temperature.

In testimony whereof I hereto affix my signature in presence of two witnesses.

KIKEI NISHIKAWA.

Witnesses:
REN YAKI,
E. WATANOBE.